United States Patent
Mitchell

(10) Patent No.: US 6,338,205 B2
(45) Date of Patent: *Jan. 15, 2002

(54) FOOTWEAR WITH MOLDED WEB PLATFORM FOR ATTACHING OUTSOLE

(75) Inventor: David Mitchell, Clarksville, TN (US)

(73) Assignee: Georgia Boot LLC, Franklin, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,224

(22) Filed: Dec. 29, 1999

(51) Int. Cl.$^7$ .............................................. A43C 13/08
(52) U.S. Cl. .................. 36/14; 36/4; 36/55; 12/142 B; 12/142 C
(58) Field of Search ........................... 36/4, 12, 14, 18, 36/19 R, 19.5, 21, 17 R, 87; 12/142 B, 142 C, 142 E, 142 RS, 142 T

(56) References Cited

U.S. PATENT DOCUMENTS

| | | | | |
|---|---|---|---|---|
| 2,339,524 A | * | 1/1944 | Stritter ........................... | 36/78 |
| 3,362,091 A | * | 1/1968 | Drago ............................ | 36/87 |
| 3,597,862 A | * | 8/1971 | Vogel ............................. | 36/87 |
| 4,599,810 A | * | 7/1986 | Sacre ............................. | 36/55 |
| 5,038,500 A | * | 8/1991 | Nicholson .................... | 36/59 C |
| 5,144,759 A | * | 9/1992 | Mascotte .................... | 36/71 R |
| 5,743,027 A | * | 4/1998 | Barma ............................ | 36/4 |
| 5,802,740 A | * | 9/1998 | Merk, Sr. ..................... | 36/55 |
| 5,911,491 A | * | 6/1999 | Huff ............................ | 36/17 R |

FOREIGN PATENT DOCUMENTS

FR 2488788 * 2/1982 .................... 36/87

OTHER PUBLICATIONS

Advertisement for Rocky Roka Extreme Snow Boot.
Advertisement for Columbia Sportswear All Weather Nisqually Boot.

* cited by examiner

Primary Examiner—Paul T. Sewell
Assistant Examiner—Troy Arnold
(74) Attorney, Agent, or Firm—Milton Wolson

(57) ABSTRACT

Footwear including a molded shell for enveloping the wearer's foot and wherein an integral web platform is molded with the shell. The bottom of the shell and the web platform is cemented to the outsole and then the web portion is stitched to the outsole.

19 Claims, 3 Drawing Sheets

FOOTWEAR WITH MOLDED WEB PLATFORM FOR ATTACHING OUTSOLE

BACKGROUND OF THE INVENTION

1. Field of the Invention

This invention relates broadly to the field of footwear formed of a molded shell comprising an upper and insole. More particularly, this invention relates to such footwear in which the molded shell includes a molded web platform thereon for securing the outsole.

2. State of the Art

Footwear comprising a molded upper formed of material such as thermoplastic urethane has several advantages over footwear comprising a rubber upper. Such molded uppers are, for example, more abrasion resistant than rubber uppers. Molded uppers are also more uniform in appearance than rubber uppers because they do not vary in texture or color as do rubber uppers.

There are, however, certain shortcomings associated with footwear having molded shells. For example, the insole platform of the molded shell must often have a matching configuration to the outsole to which it is cemented in order to provide a close fit between the insole and the outsole. Because the insole may have a unique configuration, it is necessary that the outsole have matching unique configuration. This means that if a variety of insoles are being produced an equal variety of outsoles must be maintained. Furthermore, should it be desired to replace a worn outsole, it would be necessary to use a replacement outsole having a configuration that matches the insole. Here again, it would be necessary to maintain a wide variety of outsoles for replacement purposes. It would therefore be desirable to provide footwear having a molded shell which does not require an outsole of a particular matching configuration, either for original production or replacement.

Footwear having molded shells are often designed to be of waterproof construction. When, however, such a shell is secured to the outsole by stitching through the shell, the stitches may create holes in the shell through which water may seep. It would therefore be desirable to provide footwear having a molded shell which is secured to the outsole by stitching but which would not have holes in the shell through which water may enter and contact the wearer's foot. It would also desirable to provide footwear formed of a molded upper and an outsole in which a stitched web platform creates a fashionable European-style appearance.

SUMMARY OF THE INVENTION

It is therefore an object of the invention to provide footwear having a molded shell comprising an insole which does not require an outsole of the same configuration as the insole.

It is another object of the invention to provide footwear having a molded shell comprising an insole having a web platform which is stitched to the outsole, and wherein the shell does not include holes through which water may enter and contact the wearer.

It is a still further object of the invention to provide footwear having a molded shell comprising an insole having a web platform which is stitched to the outsole to create footwear of a fashionable European-style appearance.

In accordance with these objects, the footwear of the present invention has a molded shell, the bottom portion of which is an insole, and an integrally molded web platform around the periphery of the bottom portion. The outsole is first cemented to the bottom of the insole and to the bottom of the web platform and then the web platform is stitched to the outsole. With the provided arrangement, it is not necessary that the insole and the outsole have the same configuration since the stitching securing the web platform to the outsole conceals any spacing that may occur because the inner sole and outsole are not of matching configurations. The stitching also prevents separation of the inner and outsole soles. It is therefore unnecessary to maintain a wide variety of outsoles for the production or repair of the footwear. In addition, since it is the web platform which is stitched to the outsole and not the platform of the shell which surrounds the foot, any holes created by the stitching will occur in the web platform and not in the shell. Thus, there are no openings in the shell through which water may seep. Further, an aesthetically pleasing molded footwear having a stitched web platform is provided.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
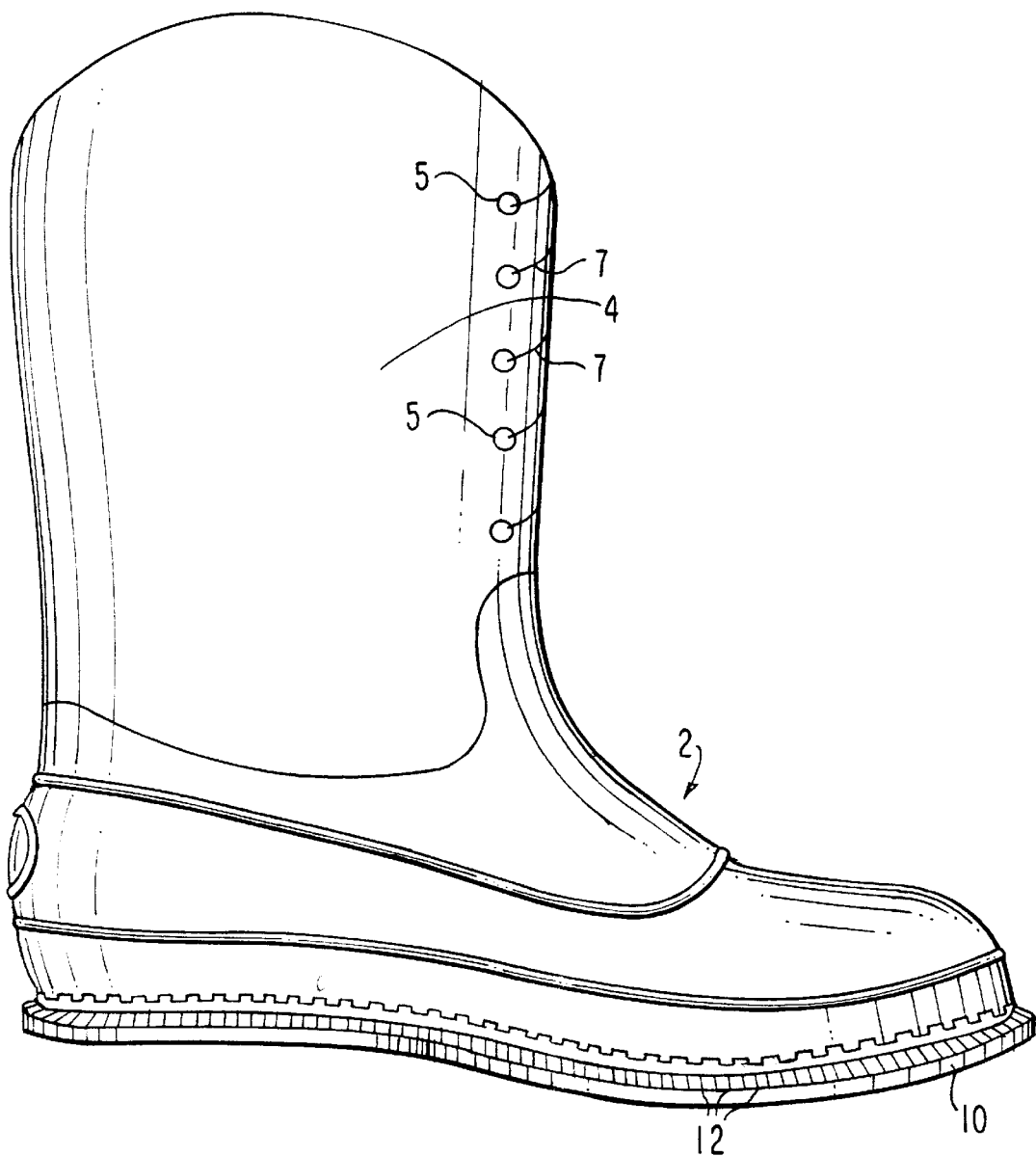
FIG. 1 is a side elevational view of the molded shell comprising a web platform of the present invention.
Figure 2:
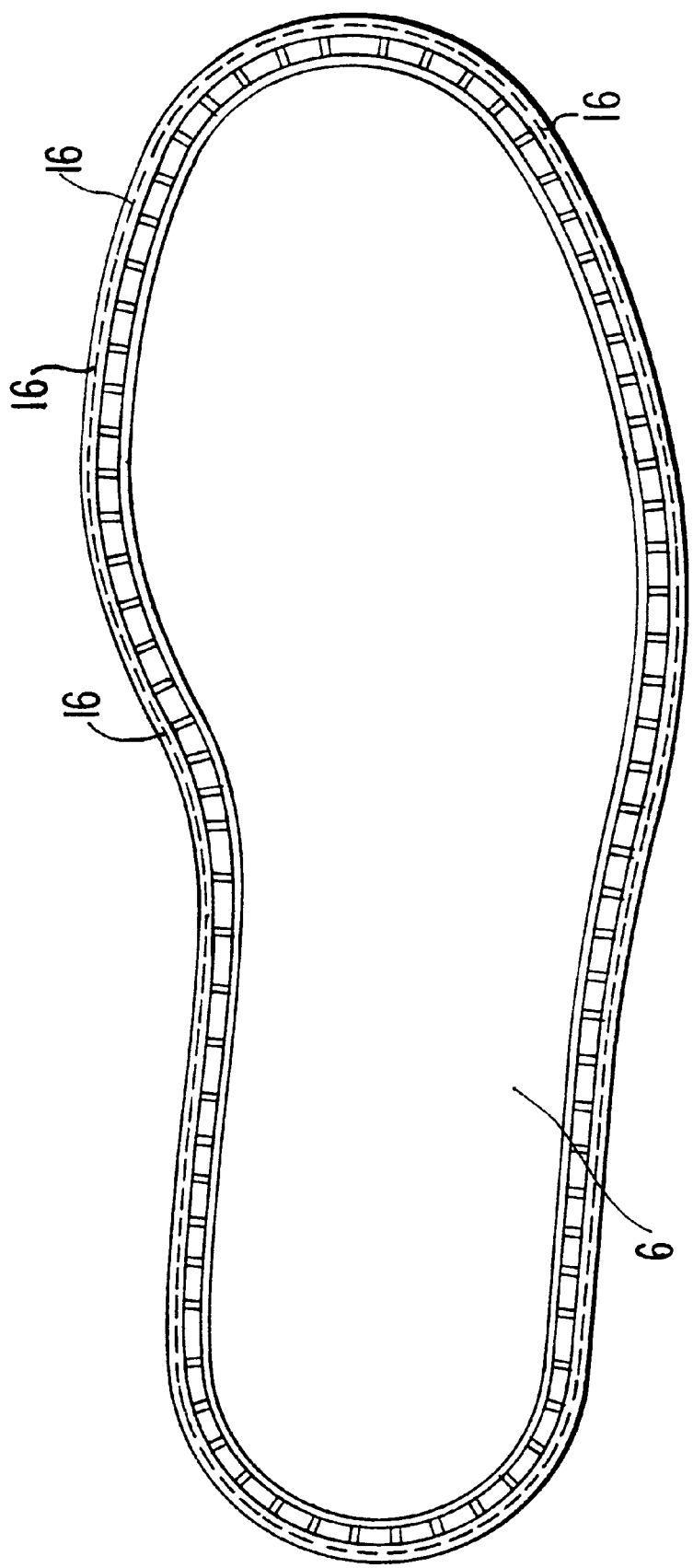
FIG. 2 is a plan view of the web platform and the bottom of the molded shell which forms the insole.
Figure 3:
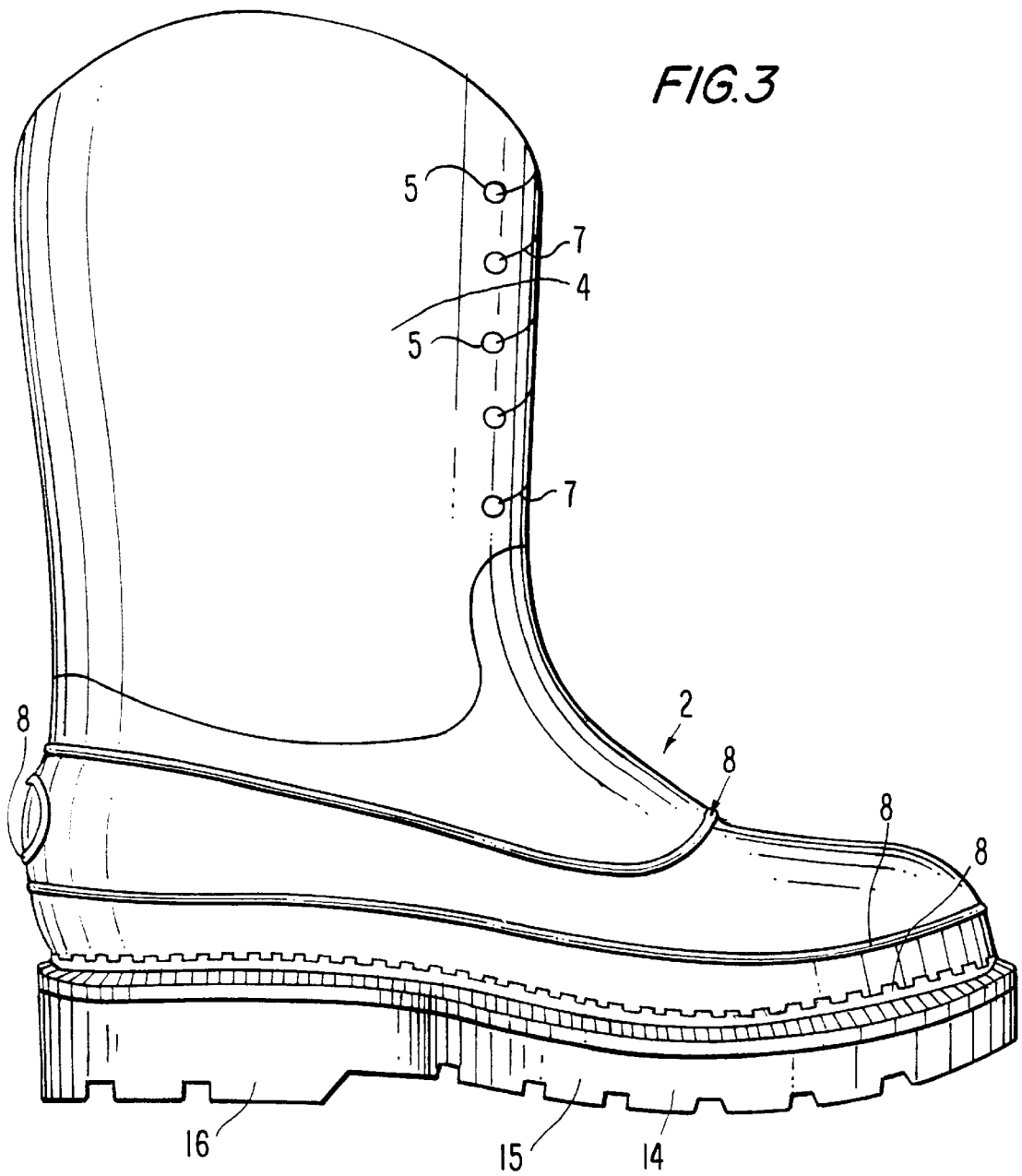
FIG. 3 is a side elevational view of a boot formed of the molded shell comprising a web platform shown in FIG. 1.

There is shown in FIGS. 1 and 2 a molded shell 2 formed from suitable material such as thermoplastic urethane by a conventional molding process. Shell 2 comprises an upper 4 and contiguous bottom platform 6, which serves as an insole for fully enveloping the wearer's foot. Upper 4 includes eyelets 5 for lacing 7. Shell 2 may include various embossed aesthetic designs 8. An integral web platform 10 is molded on shell 2 and extends around the periphery of shell 2 at the bottom platform thereof. Although shell 2 is shown as an upper for a boot, the present invention may also be used for a shoe. Web platform 10 includes spaced indentations 12 throughout the top portions thereof for aesthetic purposes. An outsole 15 having treads 14 thereon includes a heel platform 16. The outsole may be formed of rubber such as sold by Quabaug corporation under the registered trademark "Vibram".

To produce the footwear of the present invention, the bottom of web platform 10 and the bottom of insole 6 are cemented to the top of outsole 14 in conventional manner. The web platform 10 is then stitched to the outsole 14 by stitches 16 (see FIG. 2). The stitching may, for example, be of the type known as Goodyear stitching, and the width of the stitches 16 may be approximately six per inch. In this manner, the shell 2 and the integral web platform 10 thereon are firmly secured to the outsole 14.

There has been described and illustrated herein footwear comprising a molded shell for fully enveloping the wearer's foot and wherein an integral web platform is molded with the shell. The bottom of the shell and the web platform is cemented to the outsole and then the web platform is stitched to the outsole. While a particular embodiment of the invention has been described, it is not intended that the invention be limited thereto, as it is intended that the invention be as broad in scope as the art will allow and that the specification be read likewise. It will therefore be appreciated by those skilled in the art that modifications could be made to the provided invention without deviating from its spirit and scope as claimed.

I claim:

1. A molded shell for enveloping a wearer's foot, said shell having an upper and contiguous bottom portion which forms an insole and an integrally molded web platform extending around the periphery of the bottom platform whereby the web platform is molded with the shell so that the shell and web platform are formed of the same material.

2. A shell according to claim 1, wherein said shell and web platform are formed of thermoplastic urethane.

3. Improved footwear comprising:
   a) a molded shell for enveloping a wearer's foot, said shell having an upper and contiguous bottom platform which forms an insole and an integrally molded web platform extending around the periphery of the bottom platform thereof, wherein the web platform is molded with the shell so that the shell and web platform are formed of the same material; and
   b) an outsole which is secured to the shell and web platform by cement and to the web platform by stitching.

4. Improved footwear according to claim 3, wherein said shell and web platform are formed of thermoplastic urethane.

5. Improved footwear according to claim 3, wherein said outsole includes a heel.

6. A method for manufacturing footwear comprising molding a shell for enveloping a wearer's foot and wherein the shell has an upper and contiguous bottom platform which forms an insole and an integrally molded web platform extending entirely around the periphery of the bottom platform and wherein the web platform is molded with the shell whereby the shell and web platform thereof are formed of the same material and securing the shell to the outsole.

7. A method for mnaufacturing footwear according to claim 6, wherein the outsole is secured to the shell and web platform by cement.

8. A method for manufacturing footwear according to claim 6, wherein the outsole is further secured to the shell and web platform by stitching.

9. Improved footwear comprising:
   a) a molded shell for enveloping a wearer's foot, said shell having an upper and contiguous bottom portion which forms an insole and an integrally molded web platform extending around the periphery of the bottom portion thereof, wherein the web platform is molded with the shell so that the shell and web platform are formed of the same material; and
   b) an outsole which is secured to the web platform by stitching.

10. Improved footwear according to claim 9, wherein said shell and web platform are formed of thermoplastic urethane.

11. Improved footwear according to claim 9, wherein said outsole includeds a heel.

12. Improved footwear comprising:
   a) a molded shell for enveloping a wearer's foot, said shell having an upper and contiguous bottom portion which forms an insole and an integrally molded web platform extending around at least part of the periphery of the bottom portion thereof, wherein the web platform is molded with the shell so that the shell and web platform are formed of the same material; and
   b) an outsole which is secured to the shell and web platform by cement and to the web platform by stitching.

13. Improved footwear according to claim 12, wherein said shell and web platform are formed of thermoplastic urethane.

14. Improved footwear according to claim 12, wherein said outsole includes a heel.

15. Improved footwear comprising:
   a) a molded shell for enveloping a wearer's foot, said shell having an upper and contiguous bottom portion which forms an insole and an integrally molded web platform extending around at least part of the periphery of the bottom portion thereof, wherein the web platform is molded with the shell so that the shell and web platform are formed of the same material; and
   b) an outsole which is secured to the web platform by stitching.

16. Improved footwear according to calim 15, wherein said shell and web platform are formed of thermoplastic urethane.

17. Improved footwear according to claim 15, wherein said outsole includes a heel.

18. Method for manufacturing footwear comprising molding a shell for enveloping a wearer's foot and wherein the shell has an upper and contiguous bottom portion which forms an insole and an integrally molded web platform extending around at least part of the periphery of the bottom portion and wherein the web platform is molded with the shell so that the shell and web platform thereof are formed of the same material and securing the outsole to the web platform by stitching.

19. A method for manufacturing footwear according to claim 18, wherein the outsole is secured to the shell and web platform by cement.

* * * * *

UNITED STATES PATENT AND TRADEMARK OFFICE
CERTIFICATE OF CORRECTION

PATENT NO. : 6,338,205 B2
DATED : January 15, 2002
INVENTOR(S) : Mitchell

It is certified that error appears in the above-identified patent and that said Letters Patent is hereby corrected as shown below:

<u>Column 3,</u>
Line 10, after "extending" insert -- entirely --
Line 39, change "manaufacturing" to -- manufacturing --

<u>Column 4,</u>
Line 7, change "includeds" to -- includes --
Line 34, change "calim" to -- claim --

Signed and Sealed this

Fourteenth Day of May, 2002

Attest:

JAMES E. ROGAN
Attesting Officer
Director of the United States Patent and Trademark Office